(12) United States Patent
Kikuchi et al.

(10) Patent No.: US 11,370,310 B2
(45) Date of Patent: Jun. 28, 2022

(54) VEHICLE POWER SUPPLY SYSTEM

(71) Applicant: TOYOTA JIDOSHA KABUSHIKI KAISHA, Toyota (JP)

(72) Inventors: Takaji Kikuchi, Toyota (JP); Kenji Funahashi, Kariya (JP); Yuji Toba, Kariya (JP); Daisuke Hoshino, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 33 days.

(21) Appl. No.: 16/724,523

(22) Filed: Dec. 23, 2019

(65) Prior Publication Data

US 2020/0207223 A1 Jul. 2, 2020

(30) Foreign Application Priority Data

Dec. 27, 2018 (JP) .............................. JP2018-245011

(51) Int. Cl.
*B60L 50/60* (2019.01)
*B60L 53/22* (2019.01)
(Continued)

(52) U.S. Cl.
CPC .............. *B60L 50/66* (2019.02); *B60L 53/16* (2019.02); *B60L 53/22* (2019.02);
(Continued)

(58) Field of Classification Search
CPC ........ B60L 50/62; B60L 50/50; B60L 15/007; B60L 1/00; B60L 50/53; B60L 1/006;
(Continued)

(56) References Cited

U.S. PATENT DOCUMENTS 8,415,845 B2 * 4/2013 Miyachi ................. H02K 3/522
310/71
2010/0327680 A1 12/2010 Miyachi et al.
(Continued)

FOREIGN PATENT DOCUMENTS

EP 2596979 A1 5/2013
EP 2639099 A1 9/2013
(Continued)

*Primary Examiner* — Rexford N Barnie
*Assistant Examiner* — Elim Ortiz
(74) *Attorney, Agent, or Firm* — Oliff PLC (57) ABSTRACT

A vehicle power supply system includes: a main battery; a sub-battery with output voltage; a power converter having an input end connected to the main battery and an output end connected to a motor and converting output power of the main battery to driving power for the motor; a voltage converter connected between the main battery and the sub-battery and stepping down the voltage of the main battery to the voltage of the sub-battery; a charging inlet connected to the main battery and connecting to a power supply device outside a vehicle; a capacitor connected between a positive electrode and a negative electrode of the input end; and a coil connected between the main battery and the voltage converter. The coil is connected to the capacitor not via a charging power path from the charging inlet to the main battery.

6 Claims, 10 Drawing Sheets

(51) Int. Cl.
*B60L 53/16* (2019.01)
*H02M 7/5387* (2007.01)
*H02P 27/06* (2006.01)

(52) U.S. Cl.
CPC .......... *H02M 7/5387* (2013.01); *H02P 27/06* (2013.01); *B60L 2210/30* (2013.01); *B60L 2210/40* (2013.01)

(58) Field of Classification Search
CPC .......... B60L 1/003; B60L 50/10; B60L 50/11; B60L 50/12; B60L 50/13; B60L 50/14; B60L 50/15; B60L 50/16; B60L 50/51; H02K 11/02; H02M 1/14; H02M 2001/342; H02M 2001/344; H02M 2001/364; H02M 2001/348; B60K 6/22; H01F 17/04; H01F 2017/0093; H02J 3/381
USPC ........ 307/9.1, 10.1, 10.7, 18, 24, 31, 32, 35, 307/43, 45, 46, 52, 64; 320/111, 126, 320/128, 137
See application file for complete search history.

(56) References Cited

U.S. PATENT DOCUMENTS

| | | | |
|---|---|---|---|
| 2012/0049770 | A1 | 3/2012 | Bouchez et al. |
| 2013/0221921 | A1 | 8/2013 | Ang |
| 2014/0203634 | A1* | 7/2014 | Sugiyama ............... B60L 50/61 307/10.1 |
| 2014/0239712 | A1* | 8/2014 | Yoon ........................ B60L 1/00 307/10.1 |
| 2016/0207403 | A1 | 7/2016 | Iida et al. |
| 2019/0123675 | A1* | 4/2019 | Nawa ..................... H02M 1/126 |

FOREIGN PATENT DOCUMENTS

| | | |
|---|---|---|
| JP | 2011-030406 A | 2/2011 |
| JP | 2012-085510 A | 4/2012 |
| JP | 2016-134976 A | 7/2016 |
| KR | 10-2014-0105675 A | 9/2014 |
| WO | 2012/063331 A1 | 5/2012 |

* cited by examiner

VEHICLE POWER SUPPLY SYSTEM

INCORPORATION BY REFERENCE

The disclosure of Japanese Patent Application No. 2018-245011 filed on Dec. 27, 2018 including the specification, drawings and abstract is incorporated herein by reference in its entirety.

BACKGROUND

1. Technical Field

The technique disclosed herein relates to vehicle power supply systems.

More particularly, the technique relates to a vehicle power supply system including a charging inlet for charging a main battery with a charging device outside a vehicle.

2. Description of Related Art

Power supply systems that are mounted on electric vehicles often include a main battery and a sub-battery. The voltage of the sub-battery is lower than that of the main battery. The main battery serves to supply electric power to a motor for traveling, and the sub-battery serves to supply electric power to low power devices such as an audio system and a car navigation system. The low power devices such as an audio system and a car navigation system are sometimes generally referred to as "auxiliary devices." The sub-battery that supplies electric power to the auxiliary devices is herein sometimes referred to as the auxiliary battery.

A power supply system for an electric vehicle (plug-in hybrid vehicle) disclosed in Japanese Unexamined Patent Application Publication No. 2016-134976 (JP 2016-134976 A) includes a voltage converter that steps down output power of a main battery to charge a sub-battery. The term "electric vehicle" as used herein includes plug-in hybrid vehicles including both an engine and a motor and automobiles including a battery and a fuel cell for a motor for traveling.

The vehicle power supply system of JP 2016-134976 A further includes a charging inlet so that the main battery can be charged by a power supply device outside the vehicle.

As described later, the technique disclosed herein relates to noise reduction of a vehicle power supply system including a main battery. A technique of Japanese Unexamined Patent Application Publication No. 2012-085510 (JP 2012-085510 A) is known as a technique regarding noise reduction of a vehicle power supply system. A vehicle power supply system disclosed in JP 2012-085510 A uses a coil for a motor for traveling as an inductor element for an LC filter comprised of a combination of an inductor and a capacitor.

SUMMARY

There are cases where the user uses an auxiliary device such as an audio system or a car navigation system while the main battery is being charged with the power supply device outside the vehicle. When the auxiliary device is used, the remaining charge in the sub-battery decreases accordingly. When the remaining charge in the sub-battery decreases during charging of the main battery, a main computer of the vehicle power supply system starts the voltage converter. The power supply device outside the vehicle is therefore connected to the main battery, and the voltage converter is also connected to the main battery. That is, the voltage converter is electrically connected to the power supply device outside the vehicle via the charging inlet. At this time, noise generated by the voltage converter is propagated to the power supply device through the charging inlet. Noise generated by electrical parts of an automobile therefore may not seriously affect other on-board electrical parts but may be propagated to a public power grid through the power supply device and adversely affect the public power grid.

One way to restrain noise propagation to the power supply device is to provide a noise filter between the charging inlet and the main battery. However, since a large current typically flows from the power supply device to the main battery in order to reduce the charging time, the noise filter for the charging inlet needs to be able to withstand such a large current. The larger the current capacity of the noise filter is, the larger the size of the noise filter is. Since restraining an increase in device capacity is important for automobile development, it should be avoided to mount a large filter on a vehicle. The present disclosure provides a technique of restraining noise propagation from a voltage converter to a charging inlet (power supply device outside a vehicle) while restraining an increase in volume due to addition of a filter.

A vehicle power supply system includes a power converter (inverter) that converts output power of a main battery to driving power for a motor for traveling. A capacitor is typically connected between a positive electrode and a negative electrode of an input end of the inverter. The capacitor is provided in order to stabilize an input voltage to the inverter. Alternatively, in the case where the inverter includes a boost converter, the capacitor may be provided as a component of the boost converter in order to store electrical energy. The technique disclosed herein reduces high-frequency noise that is transmitted to a charging inlet (power supply device outside the vehicle) by using a capacitor connected to the input end of the inverter.

A first aspect of the disclosure relates to a vehicle power supply system. A vehicle power supply system includes: a main battery; a sub-battery with output voltage lower than that of the main battery; a power converter including an input end connected to the main battery and an output end connected to a motor for traveling and configured to convert output power of the main battery to driving power for the motor; a voltage converter connected between the main battery and the sub-battery and configured to step down a voltage of the main battery to a voltage of the sub-battery; a charging inlet connected to the main battery and configured to connect to a power supply device outside a vehicle; a capacitor connected between a positive electrode and a negative electrode of the input end of the power converter; and a coil connected between the main battery and the voltage converter. The coil is connected to the capacitor not via a charging power path from the charging inlet to the main battery.

A second aspect of the disclosure relates to a vehicle power supply system. The vehicle power supply system includes: a main battery; a sub-battery with output voltage lower than that of the main battery; a power converter including an input end connected to the main battery and an output end connected to a motor for traveling and configured to convert output power of the main battery to driving power for the motor; a voltage converter connected between the main battery and the sub-battery and configured to step down a voltage of the main battery to a voltage of the sub-battery; a charging inlet connected to the main battery and configured to connect to a power supply device outside a vehicle; a capacitor connected between a positive electrode and a negative electrode of the input end of the power converter; and a coil connected between the capacitor and the voltage converter.

In the above configuration, the coil and the capacitor form a high-frequency noise filter (LC filter) to reduce high-frequency noise that is propagated from the voltage converter to the charging inlet (the power supply device outside the vehicle).

The above configuration restrains an increase in size due to addition of the filter in the following two points. Firstly, the capacitor (capacitor for the inverter) originally provided in an electric vehicle is used as an inductor element of the high-frequency noise filter. It is therefore not necessary to add another capacitor for the high-frequency noise filter. Secondly, the coil is connected to the capacitor not via the charging power path from the charging inlet to the main battery (the coil is connected to the capacitor such that the coil is not interposed between the charging inlet and the main battery). Accordingly, a large current will not flow in the coil even when the main battery is being charged with the power supply device outside the vehicle through the charging inlet. That is, the current capacity required for the coil is smaller than the maximum current that flows from the power supply device to the main battery. The vehicle power supply system disclosed herein can therefore use a coil with smaller current capacity as compared to the case where the charging inlet is provided with a noise filter.

In the vehicle power supply system according to the first or second aspect, the coil may be connected to a terminal of the capacitor.

The above configuration effectively reduces noise as the electrical path between the coil and the capacitor is shortened.

In the vehicle power supply system according to the first or second aspect, the coil may include a first winding and a second winding. The first winding may be connected to a positive wire connecting one terminal of the capacitor to the voltage converter. The second winding may be connected to a negative wire connecting another terminal of the capacitor to the voltage converter. The first winding and the second winding may be wound in the same direction.

The coil in the above configuration is called a common mode choke coil. The first winding (or the second winding) of the coil and the capacitor form an LC filter to reduce differential mode noise. Moreover, the first and second windings that are wound in the same direction reduce common mode noise.

The vehicle power supply system according to the first or second aspect may further include a resistor connected in series with the coil.

In the above configuration, the coil, the capacitor, and the resistor form an LCR filter. The LCR filter more effectively reduces high-frequency noise.

In the vehicle power supply system according the first or second aspect, the coil may be accommodated together with the capacitor and the voltage converter in a single case.

The above configuration eliminates the need to prepare a case exclusively to protect the coil from water. Moreover, since the voltage converter that is a noise source and the noise filter (the capacitor and the coil) are accommodated in the single case, noise that spreads out of the case is reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Details of the technique disclosed herein and improvements thereof will be described below. In the following description, the "vehicle power supply system" is simply referred to as the "power supply system" for simplicity.

First Embodiment

Figure 1:
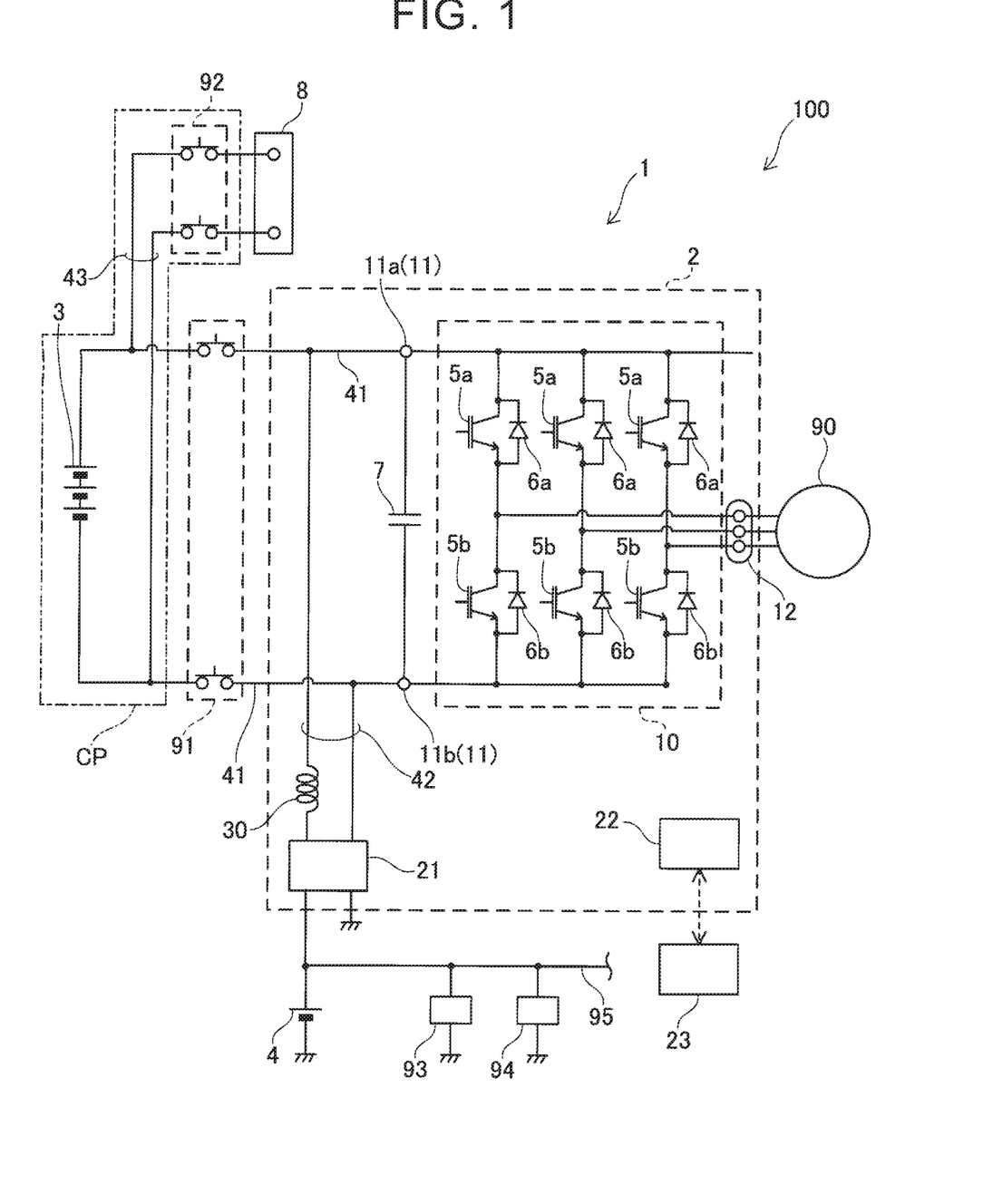
FIG. 1 is a block diagram of an electric power system of an electric vehicle including a power supply system of a first embodiment.

A power supply system 1 of a first embodiment will be described with reference to the figures. The power supply system 1 is mounted on an electric vehicle 100. FIG. 1 is a block diagram of an electric power system of the electric vehicle 100 including the power supply system 1. The electric vehicle 100 includes the power supply system 1 and a motor 90 for traveling. The power supply system 1 includes a main battery 3, a sub-battery 4, an inverter 10, a voltage converter 21, a capacitor 7, a coil 30, and a motor controller 22. The electric vehicle 100 further includes a navigation system 93, a room lamp 94, etc.

The main battery 3 stores driving power for the motor 90, and the output voltage of the main battery 3 is 100 volts or higher.

The sub-battery 4 stores electric power to be supplied to low power devices such as the navigation system 93 and the room lamp 94. The output voltage of the sub-battery 4 is lower than that of the main battery 3. The output voltage of the sub-battery 4 is, e.g., 12 volts. Those devices which are powered by the sub-battery 4 are generally referred to as auxiliary devices. The sub-battery 4 is sometimes referred to as the auxiliary battery.

The auxiliary devices such as the navigation system 93 and the room lamp 94 are connected to the sub-battery 4 via an auxiliary power line 95. The auxiliary power line 95 extends all over the electric vehicle 100, and various auxiliary devices are connected to the auxiliary power line 95. A negative electrode of the sub-battery 4 is connected to negative electrodes of the auxiliary devices via body grounds.

The inverter 10 is a device that converts the output power of the main battery 3 (direct current (DC) power) to the driving power for the motor 90 (alternating current (AC) power). An input end 11 of the inverter 10 is connected to the main battery 3 via a system main relay 91, and an output end 12 of the inverter 10 is connected to the motor 90. The system main relay 91 is closed while a main switch of the electric vehicle 100 is on.

The motor 90 of the electric vehicle 100 is sometimes reversely driven by the inertial energy of the electric vehicle 100. The motor 90 generates electric power when reversely driven. The electric power generated by the motor 90 is called regenerative power. The inverter 10 also functions to convert the regenerative power generated by the motor 90 (AC power) to DC power. The main battery 3 is charged by the converted regenerative power (DC power). Electric power sometimes flows from the output end 12 to the input end 11 of the inverter 10. However, for convenience of explanation, the terminal connected to the main battery 3 is referred to as the "input end 11," and the terminal connected to the motor 90 is referred to as the "output end 12." The main battery 3 and the inverter 10 are connected via a first power line 41.

The inverter 10 is a device that converts DC power to AC power. The inverter 10 includes three series connections of an upper arm transistor $5a$ and a lower arm transistor $5b$. The three series connections are connected in parallel. An alternating current is output from the midpoint of each series connection. A diode $6a$ is connected in anti-parallel with the upper arm transistor $5a$, and a diode $6b$ is connected in anti-parallel with the lower arm transistor $5b$. The transistors $5a$, $5b$ are controlled by the motor controller 22.

The capacitor 7 is connected between a positive electrode (input end positive electrode $11a$) and a negative electrode (input end negative electrode $11b$) of the input end 11 of the inverter 10. The capacitor 7 is provided in order to restrain pulsation of the current (voltage) flowing between the main battery 3 and the inverter 10.

The voltage converter 21 is connected between the main battery 3 and the sub-battery 4. The voltage converter 21 is a buck converter (step-down converter) that steps down the output voltage of the main battery 3. The sub-battery 4 is charged with the electric power of the main battery 3 stepped down by the voltage converter 21. The voltage converter 21 is connected to the main battery 3 via the first power line 41 and a second power line 42 branching from the first power line 41. The second power line 42 is also a power line that connects the capacitor 7 to the voltage converter 21.

The inverter 10, the voltage converter 21, the capacitor 7, and the motor controller 22 are accommodated as a power control unit 2 (PCU 2) in a single case. The coil 30 described later is also accommodated in the same case.

The power supply system 1 includes a system controller 23. The system controller 23 generally manages the entire electric vehicle 100 including the power supply system 1. The system controller 23 manages the system main relay 91, a charging relay 92, the PCU 2, the main battery 3, and the sub-battery 4.

The power supply system 1 further includes a charging inlet 8. A connector of a power supply device (not shown) outside the electric vehicle 100 can be connected to the charging inlet 8. The main battery 3 is charged with electric power supplied from the power supply device. The charging inlet 8 is attached to a vehicle body (not shown). The charging inlet 8 is usually covered by a cover (not shown) and is not visible from the outside. The charging inlet 8 is connected to the main battery 3 via the first power line 41 and a third power line 43 branching from the first power line 41. A charging relay 92 is disposed on the third power line 43. The charging relay 92 is open during traveling of the electric vehicle 100. Although not shown in the figure, the system controller 23 closes the charging relay 92 when the connector of the power supply device (not shown) is connected to the charging inlet 8. Another power converter may be connected between the charging inlet 8 and the main battery 3. This power converter is a device that can convert the electric power supplied from the power supply device to electric power suitable for charging the main battery 3.

The coil 30 is connected between the main battery 3 and the voltage converter 21. The coil 30 is connected to an intermediate part of the second power line 42. The range of the power lines surrounded by long dashed short dashed line in FIG. 1 indicates a power path (charging power path CP) from the charging inlet 8 to the main battery 3. As shown in FIG. 1, the coil 30 is electrically connected to the capacitor 7 not via the charging power path CP from the charging inlet 8 to the main battery 3. In other words, the coil 30 is connected between the capacitor 7 and the voltage converter 21.

Functions of the coil 30 will be described. As described above, the power supply system 1 can charge the main battery 3 with electric power from the power supply device outside the electric vehicle 100. The power supply device is connected to the charging inlet 8. The charging inlet 8 and the main battery 3 are connected by the power lines corresponding to the charging power path CP (a part of the first power line 41 and the third power line 43). When the user uses an auxiliary device such as the navigation system 93 or the room lamp 94 during charging, the power in the sub-battery 4 decreases accordingly. When the remaining power in the sub-battery 4 falls below a predetermined threshold, the system controller 23 starts the voltage converter 21 to charge the sub-battery 4 with the power of the main battery 3 that is being charged. When the voltage converter 21 operates, high-frequency noise generated by the voltage converter 21 is transmitted to the power supply device through the second power line 42, the first power line 41, the third power line 43, and the charging inlet 8. Accordingly, the noise may be propagated to a public power grid through the power supply device and adversely affect the public power grid.

Figure 2:
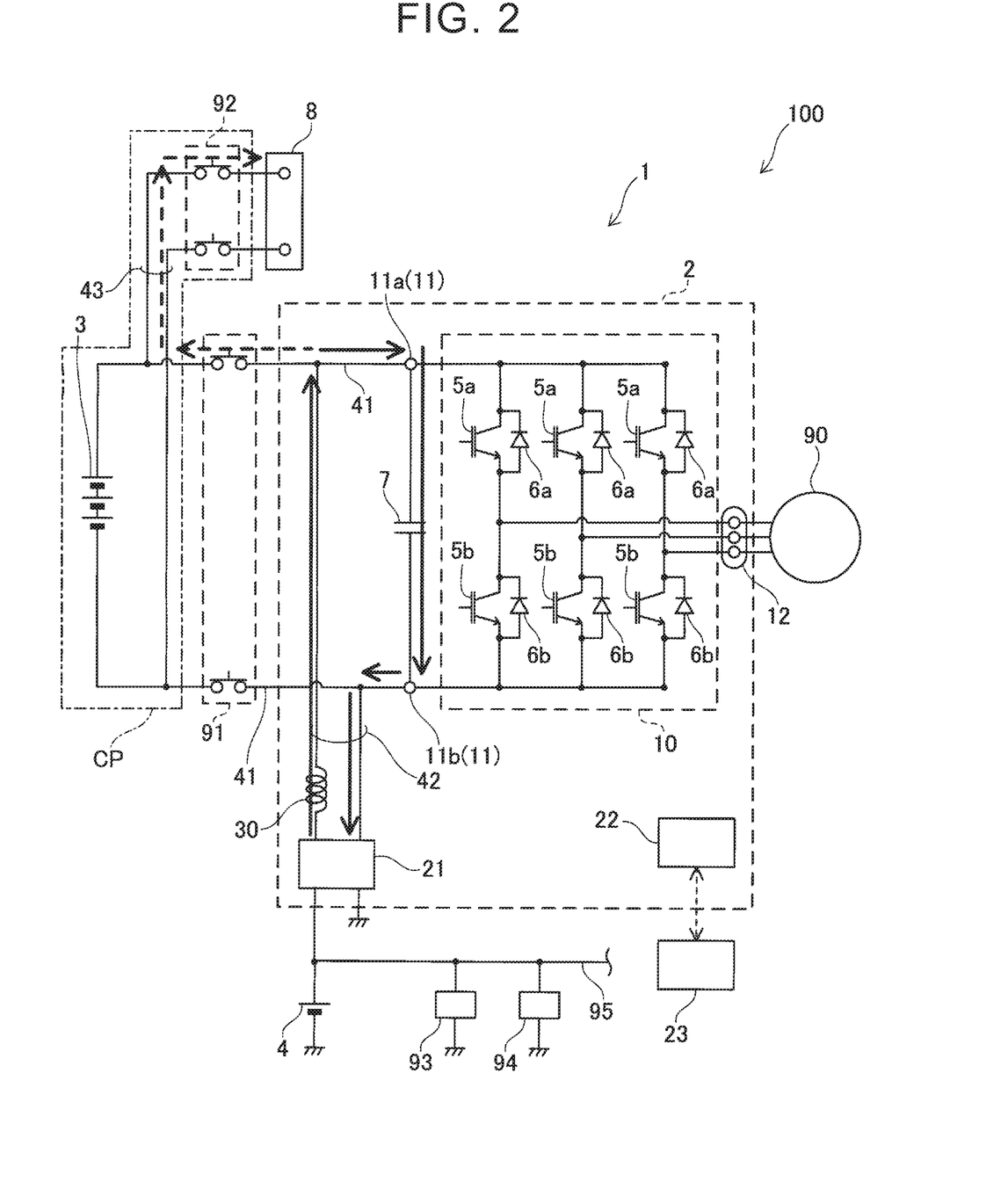
FIG. 2 is a block diagram illustrating a noise transmission path.

As can be seen from the circuit diagram of FIG. 1, the coil 30 is connected to the capacitor 7 with no electrical parts therebetween to form an LC filter. This LC filter reduces high-frequency noise generated by the voltage converter 21. FIG. 2 illustrates a propagation path of the high-frequency noise in the circuit diagram of FIG. 1. Thick solid arrows and thick dashed arrows indicate the noise propagation path. The thick solid arrows indicate a noise path passing through the LC filter (i.e., the coil 30 and the capacitor 7). The thick dashed arrows indicate a noise path to the charging inlet 8. Not all of the noise passes through the LC filter, but a part of the noise passes through the LC filter (the coil 30 and the capacitor 7). The noise reaching the charging inlet 8 (i.e., the power supply device outside the electric vehicle 100) is therefore reduced.

Advantages of the above LC filter will be described. Firstly, no special capacitor for the LC filter is required. The capacitor 7 of the LC filter is connected between the input end positive electrode $11a$ and the input end negative electrode $11b$ of the inverter 10. The capacitor 7 is originally provided in order to restrain pulsation of the current (voltage) flowing between the main battery 3 and the inverter 10. Using the capacitor 7 provided for the purpose other than being used for the LC filter eliminates the need to add a special capacitor for the LC filter.

Secondly, the current capacity required for the coil 30 is smaller as compared to the case where the charging inlet 8 is provided with an LC filter. A large current flows from the charging inlet 8 to the main battery 3 during charging. Especially during rapid charging, a large current flows from the charging inlet 8 to the main battery 3. The coil 30 and the capacitor 7 are connected not via the charging power path CP from the charging inlet 8 to the main battery 3 (the range surrounded by long dashed short dashed line in FIG. 1). A large current supplied from the power supply device outside the electric vehicle 100 therefore does not flow through the coil 30. Accordingly, the current capacity required for the coil 30 is smaller as compared to the case where the charging inlet 8 is provided with an LC filter. In other words, the current capacity required for the coil 30 is smaller than the maximum current that can flow from the outside into the power supply system 1 through the charging inlet 8. In other words, the current capacity required for the coil 30 is smaller than the current capacity of the charging inlet 8.

Second Embodiment

Figure 3:
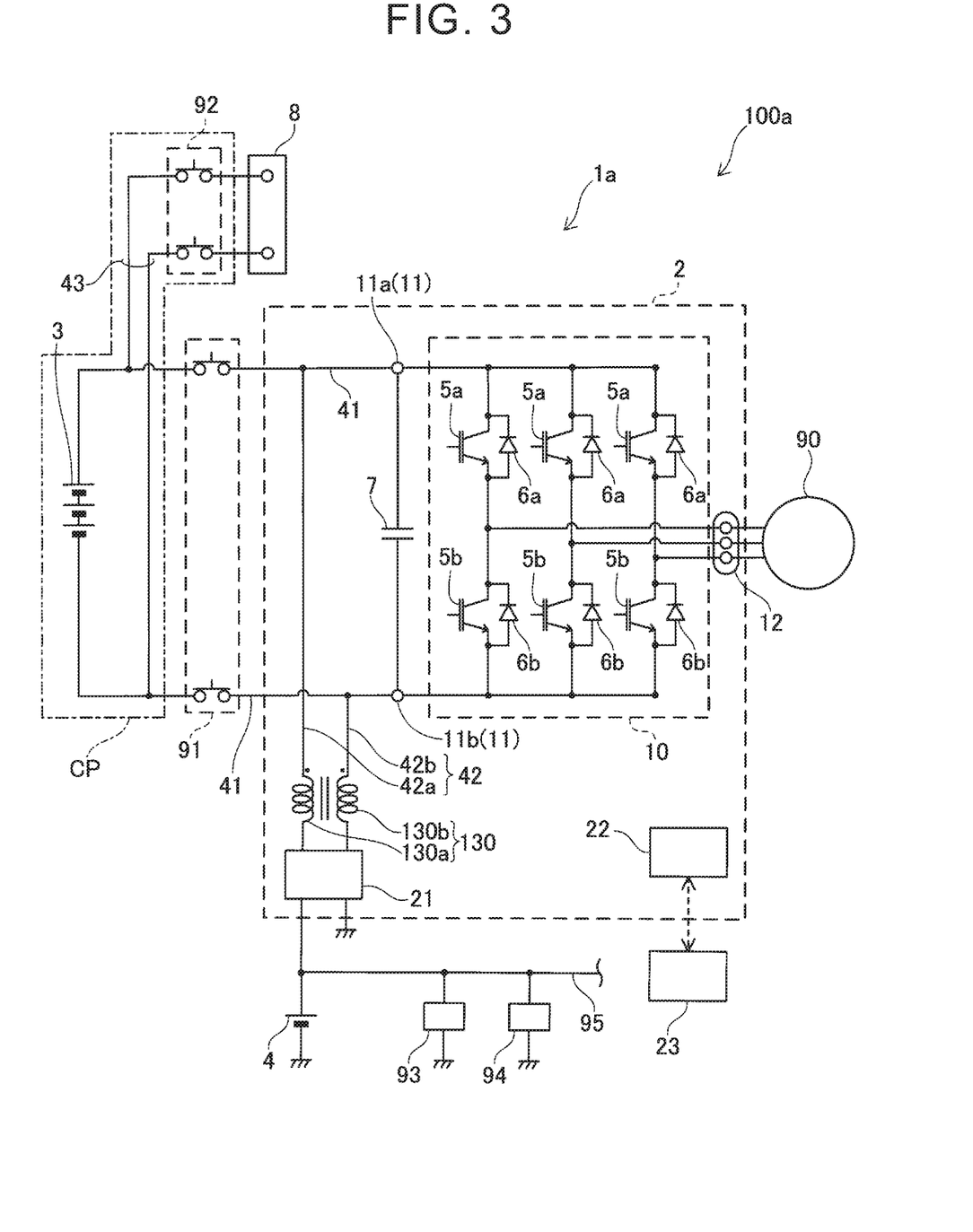
FIG. 3 is a block diagram of an electric power system of an electric vehicle including a power supply system of a second embodiment.

FIG. 3 is a block diagram of an electric power system of an electric vehicle 100a including a power supply system 1a of a second embodiment. The power supply system 1a of the second embodiment includes a coil 130 instead of the coil 30 of FIG. 1. The coil 130 is a choke coil. The structure of the power supply system 1a is the same as that of the power supply system 1 of the first embodiment except for the coil 130. The coil 130 includes two windings (a first winding 130a and a second winding 130b). The first winding 130a is connected to a positive wire 42a, and the second winding 130b is connected to a negative wire 42b. The positive wire 42a connects one terminal of the capacitor 7 to the voltage converter 21, and the negative wire 42b connects the other terminal of the capacitor 7 to the voltage converter 21. The positive wire 42a and the negative wire 42b form the second power line 42. The first winding 130a and the second winding 130b are wound in the same direction. That is, the coil 130 is a common mode choke coil.

Figure 4:
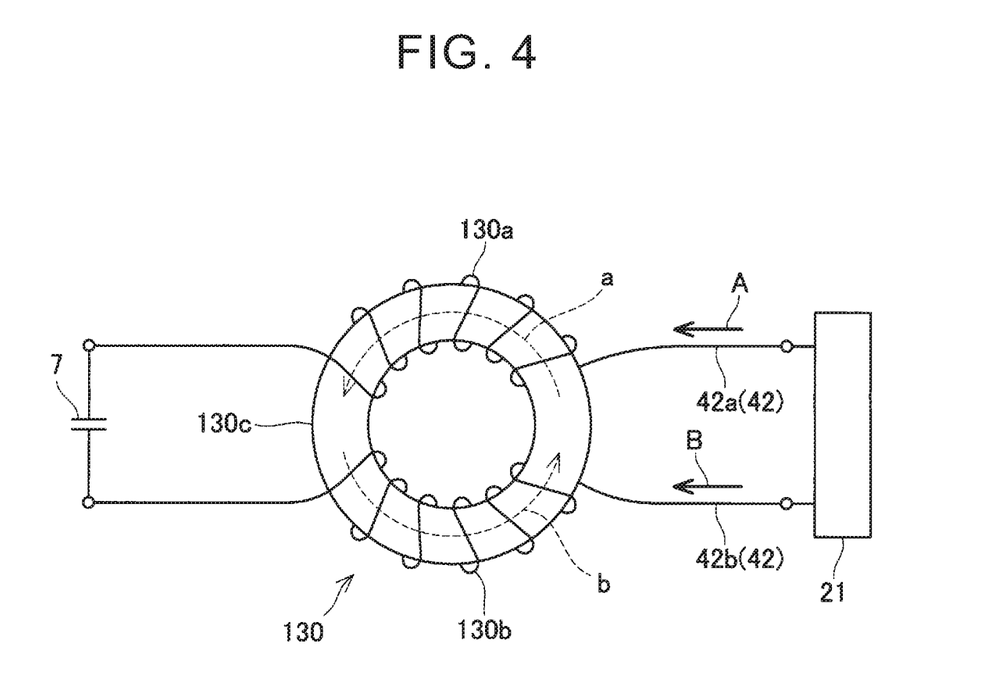
FIG. 4 is an illustration illustrating operation of a choke coil.

FIG. 4 is a schematic view of the coil 130. The first winding 130a and the second winding 130b are wound around a single core 130c in the same direction. Solid arrow A indicates the direction in which noise flows in the positive wire 42a. Solid arrow B indicates the direction in which noise flows in the negative wire 42b. Since the directions of solid arrows A, B are the same, this noise is common mode noise. Dashed arrow a indicates the direction of an induced magnetic field produced by the common mode noise flowing in the first winding 130a. Dashed arrow b indicates the direction of an induced magnetic field produced by the common mode noise flowing in the second winding 130b.

The first winding 130a and the second winding 130b are wound around the single core 130c in the same direction. The induced magnetic field produced by the first winding 130a (dashed arrow a) and the induced magnetic field produced by the second winding 130b (dashed arrow b) have the same direction and strengthen each other. Since the two induced magnetic fields strengthen each other, the inductance in the core 130c is increased. Since the inductance for the common mode noise is increased, the common mode noise is reduced.

When the directions of the currents flowing in the first winding 130a and the second winding 130b are opposite to each other, the directions of the induced magnetic fields of the first winding 130a and the second winding 130b are opposite to each other, and thus the induced magnetic fields cancel each other. As a result, the coil 130 allows the currents flowing in the opposite directions in the first winding 130a (positive wire 42a) and the second winding 130b (negative wire 42b) to pass therethrough with low resistance.

The coil 130 together with the capacitor 7 forms an LC filter and reduces noise (especially differential mode noise). The coil 130 also reduces common mode noise.

Third Embodiment

Figure 5:
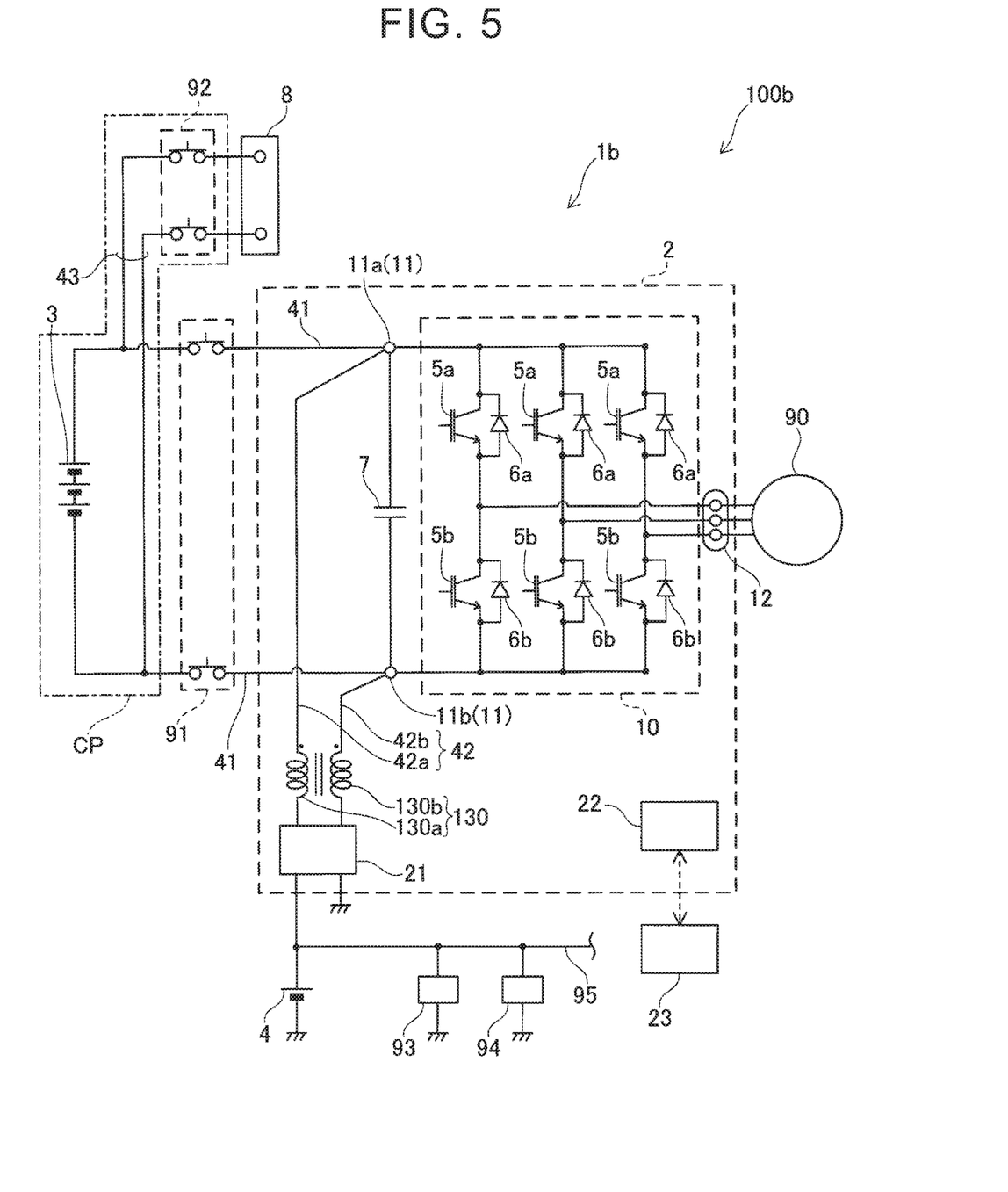
FIG. 5 is a block diagram of an electric power system of an electric vehicle including a power supply system of a third embodiment.

FIG. 5 is a block diagram of an electric power system of an electric vehicle 100b including a power supply system 1b of a third embodiment. The structure of the power supply system 1b of the third embodiment is different from that of the power supply system 1a of the second embodiment in the connection structure of the second power line 42. The structure of the power supply system 1b is otherwise the same as that of the power supply system 1a.

In the power supply system 1b, the input end positive electrode 11a of the inverter 10 also serves as one terminal of the capacitor 7, and the input end negative electrode 11b of the inverter 10 also serves as the other terminal of the capacitor 7. The positive wire 42a of the second power line 42 is connected to the one terminal of the capacitor 7 (input end positive electrode 11a), and the negative wire 42b of the second power line 42 is connected to the other terminal of the capacitor 7 (input end negative electrode 11b). That is, the coil 130 is connected to the terminals of the capacitor 7. This configuration effectively reduces noise as the electrical path between the coil 130 and the capacitor 7 is shortened.

Fourth Embodiment

Figure 6:
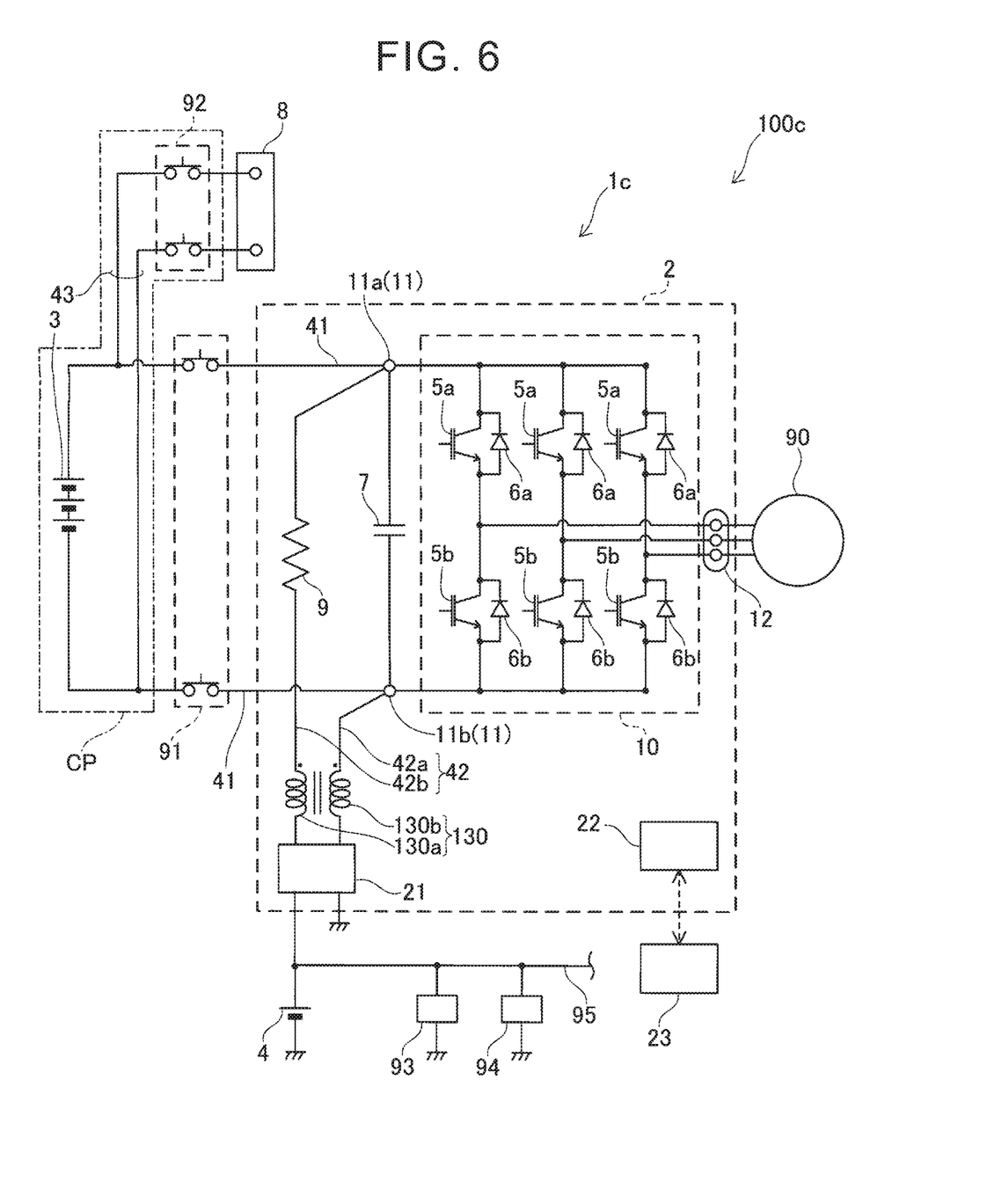
FIG. 6 is a block diagram of an electric power system of an electric vehicle including a power supply system of a fourth embodiment.

FIG. 6 is a block diagram of an electric power system of an electric vehicle 100c including a power supply system 1c of a fourth embodiment. In the power supply system 1c of the fourth embodiment, a resistor 9 is added in series to the coil 130 of FIG. 5. The structure of the power supply system 1c is the same as that of the power supply system 1b of the third embodiment except that the resistor 9 is added. The coil 130, the capacitor 7, and the added resistor 9 form an LCR filter. Since this filter is an LCR filter, a second order low-pass filter can be implemented. The LCR filter more significantly reduces high-frequency noise.

Fifth Embodiment

Figure 7:
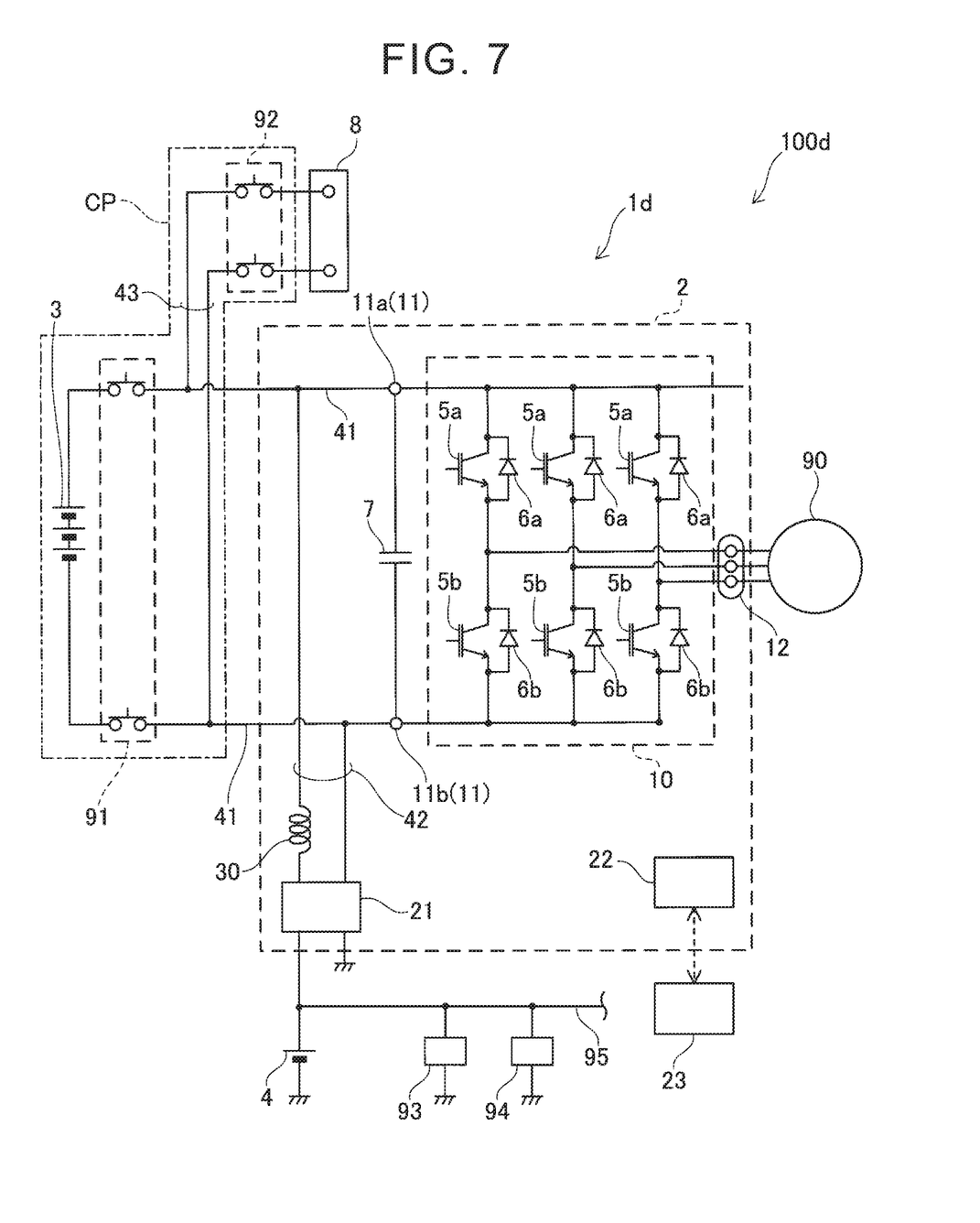
FIG. 7 is a block diagram of an electric power system of an electric vehicle including a power supply system of a fifth embodiment.

FIG. 7 is a block diagram of an electric power system of an electric vehicle 100d including a power supply system 1d of a fifth embodiment. The power supply system 1d of the fifth embodiment is different from the power supply system 1 of FIG. 1 in the relationship between the system main relay 91 and the charging relay 92. The structure of the power supply system 1d is the same as that of the power supply system 1 of the first embodiment (FIG. 1) except for the relationship between the system main relay 91 and the charging relay 92.

In the power supply system 1d of the fifth embodiment, the system main relay 91 and the charging relay 92 are disposed between the main battery 3 and the charging inlet 8. When charging the main battery 3 via the charging inlet 8, the system controller 23 closes both the system main relay 91 and the charging relay 92 (renders both the system main relay 91 and the charging relay 92 conductive). In the power supply system 1d of the fifth embodiment, the coil 30 and the capacitor 7 form an LC filter as in the power supply system 1 of the first embodiment. The power supply system 1d of the fifth embodiment therefore has the same effects as those of the power supply system 1 of the first embodiment.

As described above, the power supply systems 1 to 1c of the embodiments reduce noise that is propagated from the voltage converter 21 to the charging inlet 8.

Hardware Structure

The hardware structure of the PCU 2 of the power supply system 1b of the third embodiment shown in FIG. 5 will be described. As described above, the inverter 10, the voltage converter 21, the capacitor 7, the motor controller 22, and the coil 130 are accommodated in a single case to form the PCU 2.

Figure 8:
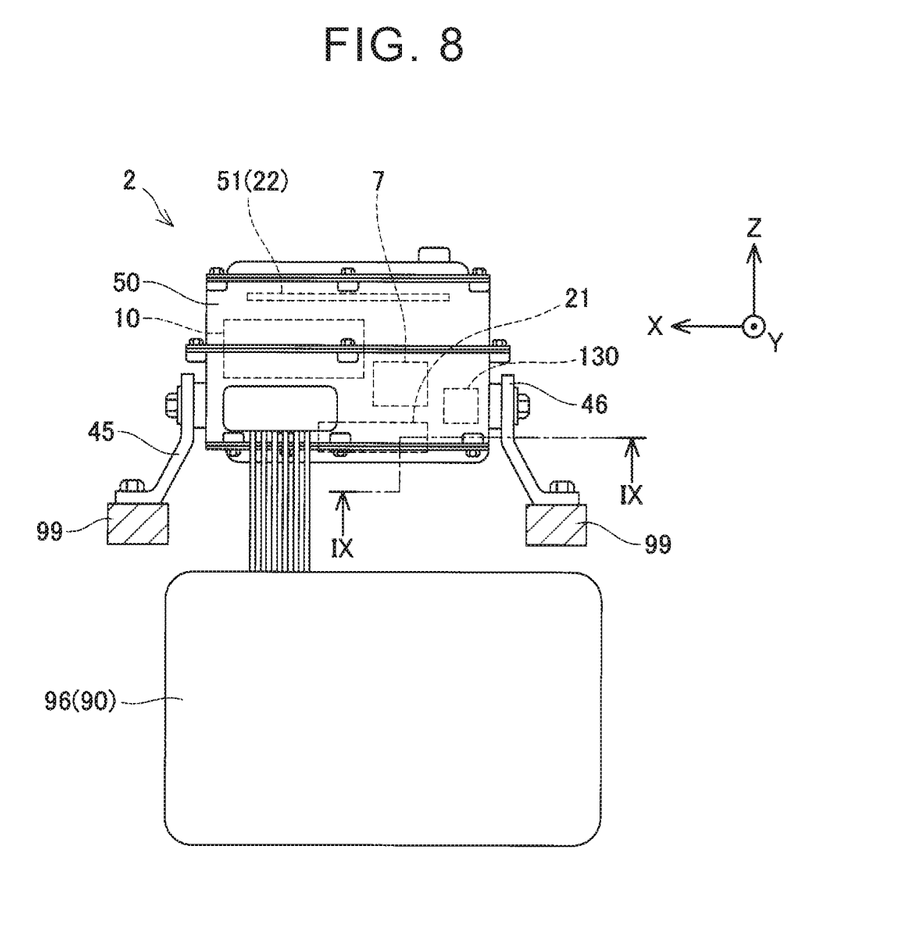
FIG. 8 is a side view of a power control unit (PCU).

FIG. 8 is a side view of the PCU 2. The PCU 2 is fixed to a crossmember 99 in a front compartment of the electric vehicle 100b. A motor housing 96 is disposed below the crossmember 99. The motor 90 is accommodated in the motor housing 96. In FIG. 8, the positive X direction of the XYZ coordinate system indicates the direction toward the front of the vehicle, the positive Z direction indicates the upward direction, and the Y direction indicates the lateral direction of the vehicle.

The PCU 2 is fixed to the crossmember 99 by a front bracket 45 and a rear bracket 46. The PCU 2 is held over the crossmember 99 such that the upper and lower surfaces of the PCU 2 are horizontal.

A case 50 accommodates a substrate 51, the inverter 10, the voltage converter 21, the capacitor 7, and the coil 130. The substrate 51 has the motor controller 22 of FIG. 5 mounted thereon. That is, the motor controller 22 is also accommodated in the case 50.

Figure 9:
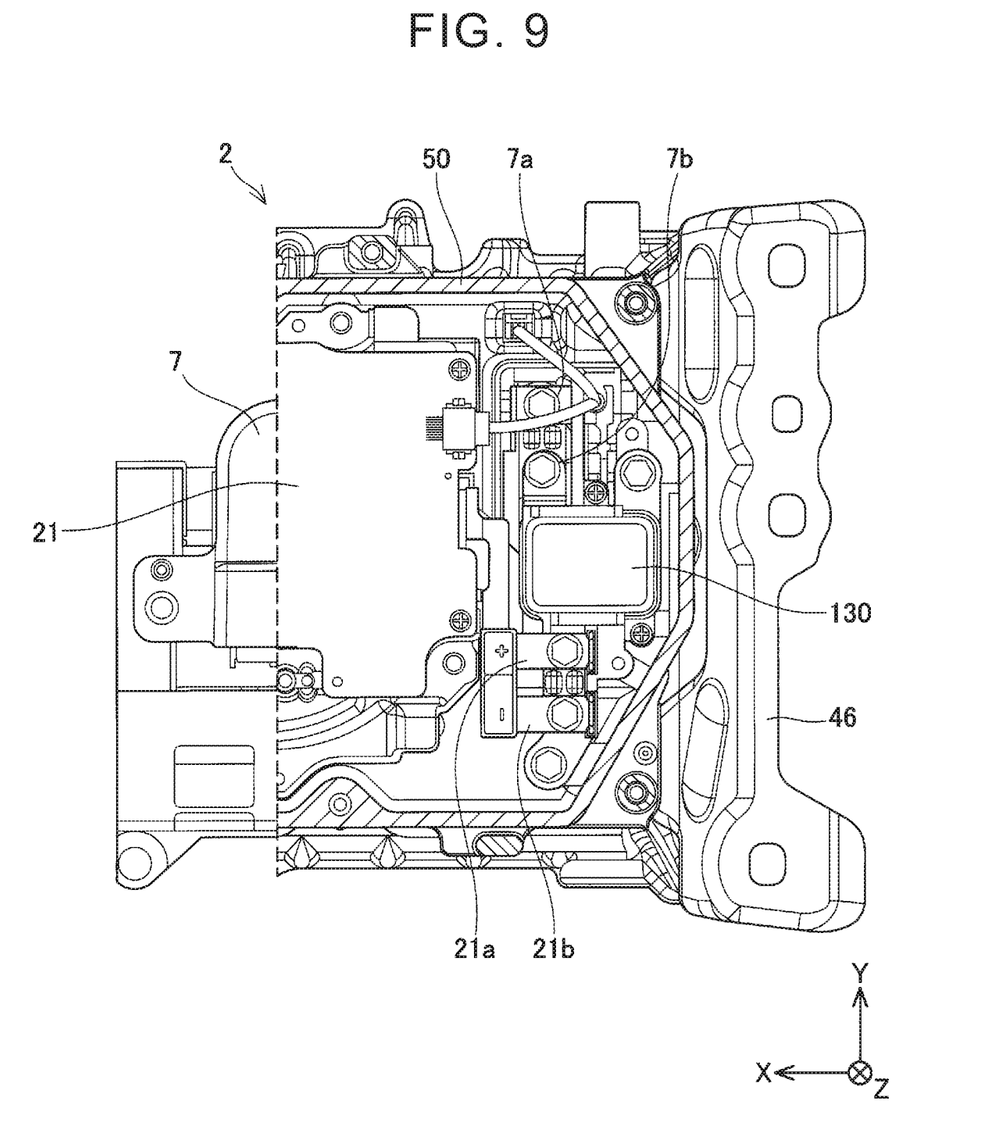
FIG. 9 is a sectional view taken along line IX-IX in FIG. 8.

FIG. 9 is a sectional view of the case 50 taken along line IX-IX in FIG. 8. FIG. 9 illustrates the parts layout in the rear part of the case 50. In FIG. 9, the voltage converter 21 is shown cut away so that the capacitor 7 disposed above the voltage converter 21 is visible.

The capacitor 7, the voltage converter 21, and the coil 130 are disposed in the rear part of the case 50. Reference characters 7a, 7b denote a positive terminal and a negative terminal, respectively, of the capacitor 7. Reference characters 21a, 21b denote a positive terminal and a negative terminal, respectively, of the voltage converter 21. The coil 130 is disposed between the terminals (positive and negative terminals 7a, 7b) of the capacitor 7 and the terminals (positive and negative terminals 21a, 21b) of the voltage converter 21.

Figure 10:
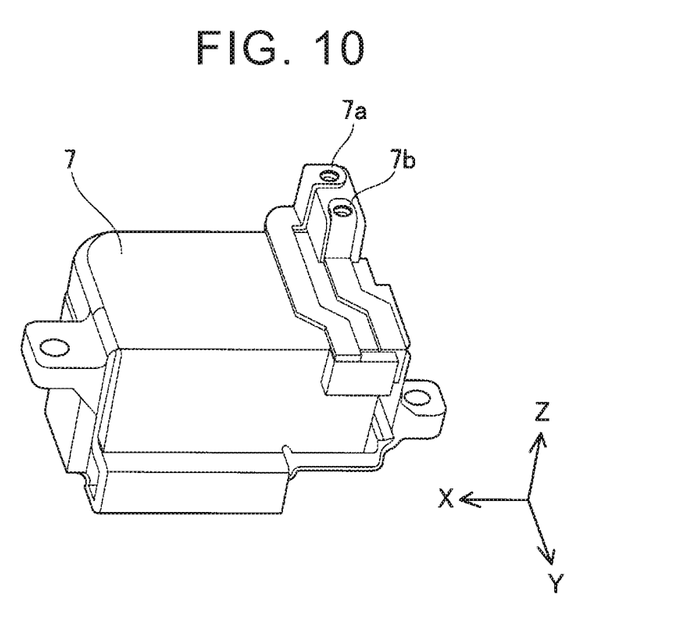
FIG. 10 is a perspective view of a capacitor.
Figure 11:
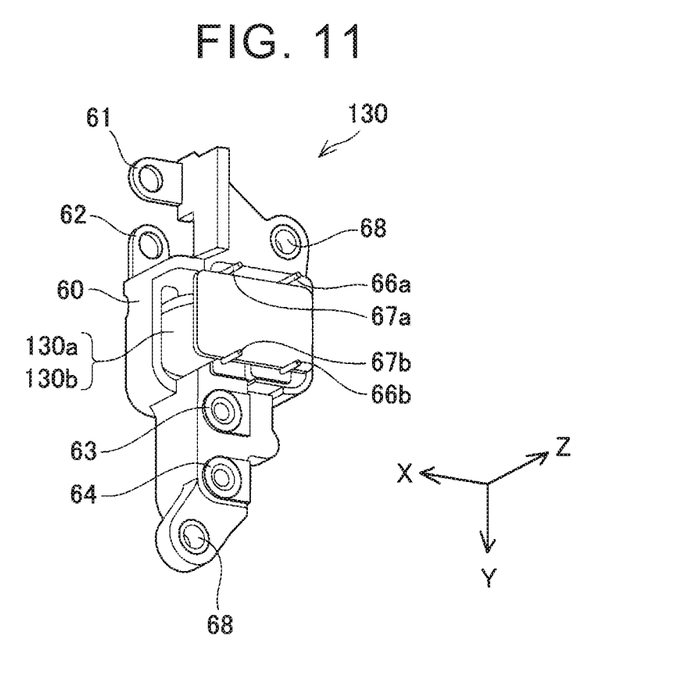
FIG. 11 is a perspective view of a coil.

FIG. 10 is a perspective view of the capacitor 7, and FIG. 11 is a perspective view of the coil 130. The direction of each axis of the XYZ coordinate system is the same as described above. The first winding 130a and the second winding 130b are accommodated in a resin case 60. The first winding 130a and the second winding 130b are covered with a potting material. The case 60 includes a fixing tab 68, and the fixing tab 68 is fixed to the case 50 with a bolt.

A capacitor-side positive bus bar 61 is welded to one terminal 66a of the first winding 130a, and a converter-side positive bus bar 63 is welded to the other terminal 66b. A capacitor-side negative bus bar 62 is welded to one terminal 67a of the second winding 130b, and a converter-side negative bus bar 64 is welded to the other terminal 67b.

The capacitor-side positive bus bar 61 is connected to the positive terminal 7a of the capacitor 7 with a bolt. The capacitor-side negative bus bar 62 is connected to the negative terminal 7b of the capacitor 7 with a bolt. The converter-side positive bus bar 63 is connected to the positive terminal 21a of the voltage converter 21 with a bolt. The converter-side negative bus bar 64 is connected to the negative terminal 21b of the voltage converter 21 with a bolt.

Advantages of the hardware structure shown in FIGS. 8 to 11 will be described. The voltage converter 21, which is a source of high-frequency noise, and the capacitor 7 and the coil 130, which form an LC filter, are accommodated in the single case 50. Noise that spreads out of the case 50 is thus reduced.

The coil 130 has a four-terminal structure having two windings (the first and second windings 130a, 130b). That is, the coil 130 includes the terminals 66a, 67a, 66b, 67b. As shown in FIG. 8, the coil 130 having a four-terminal structure is disposed between the terminals 7a, 7b of the capacitor 7 and the terminals 21a, 21b of the voltage converter 21. The connection distance between the coil 130 and each of the capacitor 7 and the voltage converter 21 is thus minimized.

The four bus bars 61 to 64 together with the windings 130a, 130b are fixed to the case 60. The four bus bars 61 to 64 and the windings 130a, 130b are thus compactly accommodated in the single case 60. Since the four bus bars 61 to 64 and the windings 130a, 130b are accommodated in the single resin case 60, a highly insulating coil unit with high vibration resistance is implemented.

Regarding the technique described in the embodiments, the "electric vehicle" as used herein includes plug-in hybrid vehicles including both a motor and an engine and automobiles including a battery and a fuel cell for a motor for traveling.

Although the specific examples of the disclosure are described above in detail, these examples are merely illustrative and are not intended to limit the scope of claims. The technique described in the claims includes various modifications and alterations of the above specific examples. The technical elements illustrated in the specification or the drawings are technically useful alone or in various combinations and are not limited to the combinations described in the claims as filed. The technique illustrated in the specification or the drawings can achieve a plurality of objects at the same time, but the technique achieving even one of the objects is technically useful.

What is claimed is:

1. A vehicle power supply system, comprising:
   a main battery;
   a sub-battery with output voltage lower than that of the main battery;
   a power converter including an input end connected to the main battery via a first power line and an output end connected to a motor for traveling and configured to convert output power of the main battery to driving power for the motor;
   a voltage converter connected between the main battery and the sub-battery, the voltage converter being connected to the main battery via the first power line and a second power line that branches from the first power line, the voltage converter being configured to step down a voltage of the main battery to a voltage of the sub-battery;
   a charging inlet connected to the main battery and configured to connect to a power supply device outside a vehicle;
   a capacitor connected between a positive electrode and a negative electrode of the input end of the power converter; and a coil connected between the main battery and the voltage converter, the coil being connected to the capacitor not via a charging power path from the charging inlet to the main battery, the coil being provided at an intermediate part of the second power line outside the voltage converter, wherein the second power line, on which the coil is provided, branches off from the first power line at a point that is electrically upstream of the capacitor, at an input side of the capacitor, when power flows from the main battery to the power converter, such that a voltage from the main battery, which has not been filtered by the capacitor, is branched off to the second power line.

2. A vehicle power supply system, comprising:
a main battery;
a sub-battery with output voltage lower than that of the main battery;
a power converter including an input end connected to the main battery via a first power line and an output end connected to a motor for traveling and configured to convert output power of the main battery to driving power for the motor;
a voltage converter connected between the main battery and the sub-battery and configured to step down a voltage of the main battery to a voltage of the sub-battery, the voltage converter being connected to the main battery via the first power line and a second power line that branches from the first power line;
a charging inlet connected to the main battery and configured to connect to a power supply device outside a vehicle;
a capacitor connected between a positive electrode and a negative electrode of the input end of the power converter; and a coil connected between the capacitor and the voltage converter, the coil being provided at an intermediate part of the second power line outside the voltage converter, wherein the second power line, on which the coil is provided, branches off from the first power line at a point that is electrically upstream of the capacitor, at an input side of the capacitor, when power flows from the main battery to the power converter, such that a voltage from the main battery, which has not been filtered by the capacitor, is branched off to the second power line.

3. The vehicle power supply system according to claim 1, wherein the coil is connected to a terminal of the capacitor.

4. The vehicle power supply system according to claim 1, wherein:
the coil includes a first winding and a second winding;
the first winding is connected to a positive wire connecting one terminal of the capacitor to the voltage converter;
the second winding is connected to a negative wire connecting another terminal of the capacitor to the voltage converter; and
the first winding and the second winding are wound in the same direction.

5. The vehicle power supply system according to claim 1, further comprising a resistor connected in series with the coil.

6. The vehicle power supply system according to claim 1, wherein the coil is accommodated together with the capacitor and the voltage converter in a single case.

* * * * *